United States Patent [19]
Berrún-Castañón et al.

[11] Patent Number: 5,766,542
[45] Date of Patent: Jun. 16, 1998

[54] REFRACTORY BRICKS FOR IRON ORE REDUCTION REACTORS

[75] Inventors: Jorge Domingo Berrún-Castañón, Ciudad Guadalupe; Marco Aurelio Flores-Verdugo, Monterrey; Tomás Gilberto Hernández-Otero, San Nicolás de los Garza, all of Mexico

[73] Assignee: Hylsa, S.A. de C.V., San Nicolás de los Garza, N.L.

[21] Appl. No.: 848,325

[22] Filed: Apr. 30, 1997

Related U.S. Application Data

[63] Continuation of Ser. No. 418,832, Apr. 7, 1995, abandoned.

[51] Int. Cl.⁶ .......................... B60G 11/02; B60G 11/22
[52] U.S. Cl. .......................... 266/44; 266/280; 266/283; 266/286
[58] Field of Search .......................... 266/280, 281, 266/283, 286, 44; 264/30; 75/433

[56] References Cited

U.S. PATENT DOCUMENTS

| | | | |
|---|---|---|---|
| 1,285,244 | 11/1918 | Kunzler | 266/280 |
| 3,330,627 | 7/1967 | McCormick et al. | 266/286 |
| 3,534,946 | 10/1970 | Westerkamp et al. | 266/286 |
| 3,715,228 | 2/1973 | Dulat | 117/46 |
| 3,749,386 | 7/1973 | Beggs et al. | 266/280 |
| 3,764,123 | 10/1973 | Beggs et al. | 266/280 |
| 3,816,101 | 6/1974 | Beggs et al. | 75/35 |
| 4,002,422 | 1/1977 | Escott | 432/99 |
| 4,046,557 | 9/1977 | Beggs | 75/35 |
| 4,336,063 | 6/1982 | Guzmán-Bofill et al. | 75/35 |
| 4,375,983 | 3/1983 | Celada et al. | 75/35 |
| 4,428,772 | 1/1984 | Dominguez-Ahedo et al. | 75/91 |
| 4,556,417 | 12/1985 | Martinez-Vera et al. | 75/35 |
| 4,793,856 | 12/1988 | Price-Falcon et al. | 75/35 |
| 5,078,787 | 1/1992 | Becerra-Novoa et al. | 75/443 |
| 5,181,954 | 1/1993 | Berrun-Castanon et al. | 75/433 |

FOREIGN PATENT DOCUMENTS

| | | |
|---|---|---|
| A-1301780 | 5/1992 | Canada. |
| A-0 296 981 | 12/1988 | European Pat. Off.. |
| A-0 637 571 | 2/1995 | European Pat. Off.. |
| A-21 05 159 | 8/1971 | Germany. |
| A-22 23 142 | 11/1972 | Germany. |
| A-37 35 444 | 2/1989 | Germany. |
| A-9405732 | 3/1995 | South Africa. |
| A-1 330 298 | 9/1973 | United Kingdom. |
| A-1337391 | 11/1973 | United Kingdom. |
| A-1398572 | 6/1975 | United Kingdom. |
| A-1398573 | 6/1975 | United Kingdom. |

OTHER PUBLICATIONS

Pages 116, 117, 121, 122, & 123 from a paper in the printed proceedings of the McMaster Symposium on Iron and Steelmaking, No. 21 on May 11–13, 1993 in Hamilton, Ontario, Canada; entitled: "Dust Treatment Facilities and its Operation in Kashima Steel Works of Sumitomo Metal Ind., Ltd." by G. Kochihira, K. Sato, M. Kojima, H. Ueki and S. Miyamoto.

Sales catalog publication of the A.P. Green Refractories Co. entitled "The Complete Green Line of Refractory Products" pp. 11–16 and cover (identified as: P–32C–670185, likely issued Dec. 1967).

*Primary Examiner*—Scott Kastler
*Attorney, Agent, or Firm*—Frommer Lawrence & Haug LLP; A. Thomas S. Safford

[57] ABSTRACT

Refractory materials (typically refractory bricks) having the exposed working surface treated to form a silica sand glazed surface for their utilization in iron ore reduction reactors, for example of the moving bed type, fluidized bed type, rotary kilns, or the like, and method and apparatus for treating refractory bricks before installation as well as for treating refractory linings already installed in existing iron ore reduction plants, which produce direct reduced iron (DRI), prereduced iron ores, or the like. Some operational problems, involving adherence and buildup of aggregates from small metallic iron particles on the refractory lining of said reduction reactor, are minimized with a corresponding decrease in operating costs and an increase in the availability of the DRI producing plant.

22 Claims, 4 Drawing Sheets

REFRACTORY BRICKS FOR IRON ORE REDUCTION REACTORS

This application is a continuation of application Ser. No. 08/418,832, filed Apr. 7, 1995, now abandoned.

FIELD OF THE INVENTION

The present invention relates to refractory bricks and to a method of manufacturing or treating refractory bricks useful for Direct Reduction reactors to produce direct reduced iron (DRI), or the like, whereby some operational problems involving the buildup of adherent small metallic iron particles to the refractory lining of said reduction reactor are minimized with a corresponding decrease in operating costs and decrease in "down" time (resulting in an increase in the productive availability of the DRI producing plant).

The invention provides refractory materials with special characteristics for their utilization in iron ore reduction reactors, and a method for treating refractory bricks before installation as well as for treating refractory linings already installed in existing iron ore reduction plants.

BACKGROUND OF THE INVENTION

Direct reduction plants for producing DRI (or in general, prereduced materials useful as feedstocks for iron and steelmaking), are currently operating in several countries of the world, mainly in places where natural gas is available at relatively low cost for industrial use.

Direct reduction plants produce DRI by contacting a reducing gas, composed principally of hydrogen and carbon monoxide, at temperatures in the range from 850° to 1050° C., in reactors where the gas-solids contact is made in a moving bed, a fluidized bed, a fixed bed or a tumbling bed within a rotary kiln type reactor. The lower temperature is determined by, among other things, the need to have the desired chemical reducing reactions proceed and at a reasonable rate; while the upper temperature is limited by the need to avoid formation of agglomerates of the particles due to stickiness of the particles at such elevated temperatures. Examples of such processes are described for example in U.S. Pat. Nos. 3,749,386; 3,764,123; 3,816,101; 4,336,063; 4,428,772; 4,556,417; 5,078,787; 4,046,557; 4,002,422; 4,375,983 and 4,793,856.

The present invention has been initially developed with respect to moving bed type reactors and consequently the following description of the invention is principally directed to moving bed reactors. However, in its broader aspects, the invention will also minimize operation problems in the other types of direct reduction reactors, or any other applications where similar conditions occur.

It is known that one of the problems encountered in the operation of direct reduction reactors of the moving bed type arises out of the tendency of the freshly metallized hot sponge iron pellets to sinter and/or agglomerate into aggregates that obstruct both the smooth downward flow of solid particles through the reactor and the uniform cross sectional distribution of the upwardly flowing reducing gases. Although applicant's assignee has made great strides in countering this tendency at ever increasing temperatures, there is always an incentive to further improve on past accomplishments so as to enable the use of even higher temperatures (without detrimental agglomeration) to increase the speed of reaction and thus the efficiency of the process resulting in increased productivity and lower cost per unit of product produced. For an example of an earlier work on this balancing of increased operating temperature versus reduction of sticking tendencies, see assignee's U.S. Pat. No. 4,793,856. See also the assignee's U.S. Pat. No. 5,181,954 for a discussion of this long known problem and a teaching of a different improvement which is part of the cumulative on-going efforts at advances in processing enabling reduction at ever higher temperatures. One of the effects of the sticking tendency involves inter-particle sticking or surface-to-surface fusion causing "cluster" agglomerations (especially under the interparticle pressure caused by the weight of the burden above). Another effect is the adhesion of small iron particles to the walls of the reactor which build up to form slab-like aggregates firmly adhered to the refractory lining, particularly in the vicinity of the hottest reducing gas at the gas inlet level into the reactor. These adhered particulate aggregates over several months can build up as slabs several inches thick, a few feet wide, and several feet long; that also can break free and jam the downstream valves and particle handling equipment, as well as disrupting the flow of particles resulting in uneven treatment.

Two mechanisms of adhesion of such small metallic iron particles to the wall have been identified, one physical and one chemical.

Although not thoroughly studied and modeled yet, it is believed that a chemical bond is formed between certain components of the refractory bricks and the metallic iron-bearing particles, which contributes to the build up of layers of such particles in the zone with the highest temperature in the reactor, namely about 2 to 3 meters above and below the hot reducing gas entrance. This is the internal surface area within the reactor where the metallized iron particles have the highest temperature and consequently are subject to the highest chemical reaction velocity.

The chemical adhesion of iron particles (at least in the presence of zinc) is described for example by G. Kochihira, K. Sato, M. Kojima, H. Ueki and S. Miyamoto in a paper presented at the McMaster Symposium on Iron, and Steelmaking, No. 21 on May 11–13, 1993 in Hamilton, Ontario, Canada, titled: "Dust Treatment Facilities and its Operation in Kashima Steel Works of Sumitomo Metal Ind., Ltd."

Kochihira et al. state that in treating in a rotary kiln high zinc containing ferrous dusts (on the order of 4% ZnO) derived from various sources within an integrated steel works, (e.g. blast furnace thickener dust) large dam rings and large lumps of deposits are formed in the kiln (as the zinc is vaporized, leaving reduced iron). The authors surmise that the mechanism of formation of such dam rings is from the buildup of a reaction layer of low melting point materials such as fayalite ($2FeO.SiO_2$) and hercynite ($FeO.Al_2O$). The authors state that by installing refractory bricks having a high SiC content "lower in reactivity with dust . . . as compared to $Al_2O_3$ materials, troubles due to deposit formation [of dam rings and lumps] decreased dramatically." FIG. 3 of this reference shows an inverse relationship between the adhesive strength ($kg/cm^2$) and the relative increase in percentage of SiC (& decrease in % $Al_2O_3$) in the composition of the refractory bricks. The adhesive strength was apparently measured from samples subjected to 1300° C. and 1400° C. temperatures for 3 hours. Their conclusion is that, if the bricks contain more SiC and less $Al_2O_3$, the strength of the adherence of the zinc-containing ferrous particles to the brick decreases. This reference (1) is not specific to $SiO_2$, (2) does not teach or suggest that a brick with a high content of SiC (or of $SiO_2$) will produce less physical adherence, (3) does not address the influence of the presence of zinc (if any) on such adherence, and (4) does not teach any brick surface treatment per se, fused or otherwise.

The present invention, however is particularly addressed to minimize the effects of the physical mechanism of adhesion (in addition to possible chemical mechanism). This mechanism has been studied and modeled by the applicants in specialized laboratory scale equipment. In such equipment, DRI pellets are continuously rubbed across the surface of sample brick surfaces under DRI reactor conditions (i.e. in a reducing atmosphere at 900°–950° C. under 3 kg pressure [equivalent to the pressure of pellets on the wall of a typical DRI reactor in the vicinity of the reducing gas inlet]). The buildup of material rubbed off the pellets over given time was measured and compared for different brick surfaces. It has been found that, at least one significant factor which promotes the build up of such slabs of metallic iron particles, is the rugosity (or pitted surface roughness) of the refractory bricks having contact with the metallized iron pellets. The zone of most adhesion of iron particles is the same zone of influence of the apparent chemical adhesion. This is explained by the fact that the iron pellets are more plastic and even sticky at high temperature, and therefore it is easier for small iron particles to adhere to the pores of the surface of refractory bricks in contact with the iron pellets.

Although it is not the intention of applicants to be bound as to the effectiveness of the invention by a particular theory or explanation of the complex phenomena involved in the adhesion, it is an object of the invention to modify the normal rugged work surface of the refractory bricks, currently used in direct reduction reactors in the upper section thereof where iron ore pellets undergo chemical reduction, so that the rugosity or pitted roughness of such surface is decreased (with possible reduction in chemical adhesiveness to the iron-bearing particles as well at DRI processing temperatures). When this surface of refractory bricks has been modified by rounding the microscopic peaks and valleys of the surface contour with fused silica, the amount of iron particles has decreased considerably.

Manufacturers of refractory bricks do not include the roughness or rugosity of the work surface as a feature to be taken into account when said materials are selected for installation in direct reduction reactors. The normal quality characteristics considered for choosing the refractory materials to be installed in a reduction reactor are: Specific Weight ($g/cm^3$), Apparent Porosity (%), Compression Strength ($kg/cm^2$), Thermal Conductivity ($Kcal/h.m.°C.$) at 1,000° C., and Tensile Strength (failure under load, etc.).

Since the problems of particle adhesion to refractory linings had not been studied before, the characteristics of the working surface of refractory bricks has not been taken into account for refractory linings used in direct reduction furnaces. The closest reference known to the applicant relative to the surface of the firebricks is found in a catalog of a manufacturer of refractories. Specifically, this catalog is a pre-1969 sales publication of the A.P. Green Refractories Co. entitled "The Complete Green Line of Refractory Products." See page 13 thereof. This describes a type of brick having a high content of silica which is recommended for "a variety of applications" in the steel industry, for example "in blast furnace stoves, open hearths, soaking pits, slab heating furnaces, forge furnaces, ceramic kilns, regenerator roofs and many other installations." The catalog identifies this brick as the "A.P. Green Semi-Silica" brick and states that is has "outstanding resistance to structural spalling [which] is primarily the result of a protective refractory glaze which forms on the surface of the brick in service" and further states that "This glaze is high in silica and . . . remains as a protective coating . . . [and] prolongs service life . . . by preventing further attack of active fluxes in the furnace gases." Emphasis added. There is absolutely no mention of the coating diminishing the chemical or physical adhesion of iron bearing particles to the brick.

In fact, as taught by this catalog the high silica content of the Semi-Silica brick cannot give a glazed surface under iron ore direct reduction conditions, because the temperatures encountered producing DRI are on order of 1000° C., and below, and thus are too low to produce such a glazed surface.

Furthermore, refractory bricks are typically manufactured at temperatures (1550° C.–1600° C.) lower than would form such a glaze, so that a glaze would not result during initial manufacture either. Even if the Semi-Silica bricks were to be manufactured by generalized heating to the fusing temperature range, this likely would result in bricks with unacceptably altered properties, useless for their intended function.

In actuality, the brick recommended and actually installed in some typical moving bed DRI reactors are the KX-99 Super Duty firebrick (listed in the catalog on pages 14 and 16 and characterized as "specially recommended for applications with severe reducing atmospheres"). Note that Super Duty (low silica content) brick was recommended over the Semi-Silica brick for the DRI furnace (thus, further teaching away from use of silica-containing brick in DRI manufacture). These KX-99 bricks, characterized in the catalog as "highest quality," when used in a direct reduction reactor at higher temperatures (on the order of 950° C. to 1000° C.) are known to be subject to formation of the detrimental large slabs in actual service. On the other hand, when applicant's inventive coating has been applied to these same bricks, applicants' laboratory comparative tests have shown that this modification is effective in significantly reducing the buildup of DRI material on the refractory brick surfaces even under equivalent DRI production conditions.

Since the protective glaze of the Semi-Silica brick is stated by the catalog to be formed "in service," that means that such bricks after installation would need to be used at very high temperatures (apparently on the order of 1700° C.) to form said glaze. Such bricks, if installed in direct reduction furnaces; however, would never form such a glaze, because the temperatures in iron ore reduction reactors are necessarily much lower than that necessary to form such glaze. Thus, since the catalog does not anticipate nor suggest in any way the advantage of a surface treated brick to decrease the physical adhesion of iron ore particles thereto, there is no incentive or teaching to add a high temperature localized fusing step to practice applicant's invention described below.

OBJECTIVES AND SUMMARY OF THE INVENTION

It is an object of the present invention to provide refractory bricks with their working surfaces already treated to be used in direct reduction reactors in particular, and more broadly in other applications where similar conditions occur, in order to minimize the adhesion of iron particles to the walls thereof.

It is another object of the invention to provide a method and an apparatus for treating refractory materials to be used in the hottest zone of the internal lining of direct reduction reactors and the like whereby such reactors have an increased operating availability.

It is a further object of the invention to provide a method and an apparatus for treating at least the vertical working surfaces of refractory bricks already installed in direct reduction reactors and the like in order to minimize the adhesion of iron particles to the walls thereof.

Other objects and advantages of the invention will be evident to those skilled in the art or will be described in this specification of the invention and appended drawings.

According to the present invention, the objects thereof are achieved by providing a method as follows:

A preferred method for treating refractory materials to be used in a portion of the internal lining of iron ore reduction reactors where hot reducing gases react with iron ore particles at a temperature in the range between 750° and 1,050° C., said method comprising: coating the working surface of the refractory materials with an effective amount of a mixture of silica sand and water to fill the voids in said surface; drying the sand coating; removing, if necessary, any excess of silica sand; and subjecting the coated surface of said refractory materials to a temperature above 1,700° C. through the impingement of a high temperature flame for a time long enough to cause said sand coating to fuse onto the surface of said refractory materials and short enough to avoid generalized heating of said refractory materials. Preferably the sand should pass a −100 size mesh so as to fill the brick surface voids and cracks sufficiently to smooth the surface upon fusion to form a coating thereon preferably of thickness of 0.2 to 1 mm.

Another preferred embodiment of the invention is an apparatus for treating refractory materials to be used in the internal lining of the portion of direct reduction reactors where hot reducing gases react with iron ore particles at a temperature in the range between 750° and 1,050° C., said apparatus comprising: a burner for producing a flame with a temperature above 1,700° C., said burner being positioned preferably within a distance no larger than 2 cm. from the surface of said refractory materials to be treated (this being a practical distance in order to have sufficiently rapid fusion), means for moving said working surface relative to the position of said burner so that said flame impinges directly over said working surface and for a time long enough to cause said sand coating to fuse over the surface of said refractory materials and short enough to avoid generalized heating of said refractory materials.

The invention is its broader aspects includes the use of any of a number of effective ceramic particles in lieu of silica sand. These preferably include at least 20% silicon-containing ceramic particles with the majority of the balance being $Al_2O_3$. Of these, the −100 mesh silica and firebrick particles are superior for practicing the invention. The firebrick particles should be mainly composed of SiO and $Al_2O_3$ (typically constituting together at least two-thirds of the particle composition), and often most of the remainder are small percentages of MgO, CaO, etc. Refractory brick particles of the KX-99 type have been tested and show usefulness almost as good as silica sand for practicing the invention, such brick particles have the following composition:

|  |  |
| --- | --- |
| $SiO_2$ | 52.4% |
| $Al_2O_3$ | 43.2% |
| $TiO_2$ | 1.8% |
| FeO | 1.0% |
| MgO | 0.2% |
| $Na_2O$ | 0.4% |
| Others | 1.0% |
|  | 100.0% |

These applied ceramic materials should maintain the glaze integrity in use within a DRI reactor and not melt at the DRI reactor temperatures of 950° C.–1050° C. Some ceramics do not test effectively for the invention. These include, for example, CaO.

Whatever material is used, it should result in the vitrification of the surface of the firebricks resulting from localized fusing of material which preferably has been ground to −100 mesh and applied to the working surface of the brick.

Surprisingly, the application of dry fine silica sand particles to the vertical wall of firebrick within a DRI reactor merely by paint brushes has proven effective to give the desired glaze after localized fusion by use of an acetylene torch.

BRIEF DESCRIPTION OF THE DRAWINGS

In this specification and in the accompanying drawings, some preferred embodiments of the invention are shown and described and various alternatives and modifications thereof have been suggested; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF THE INVENTION

Figure 1:
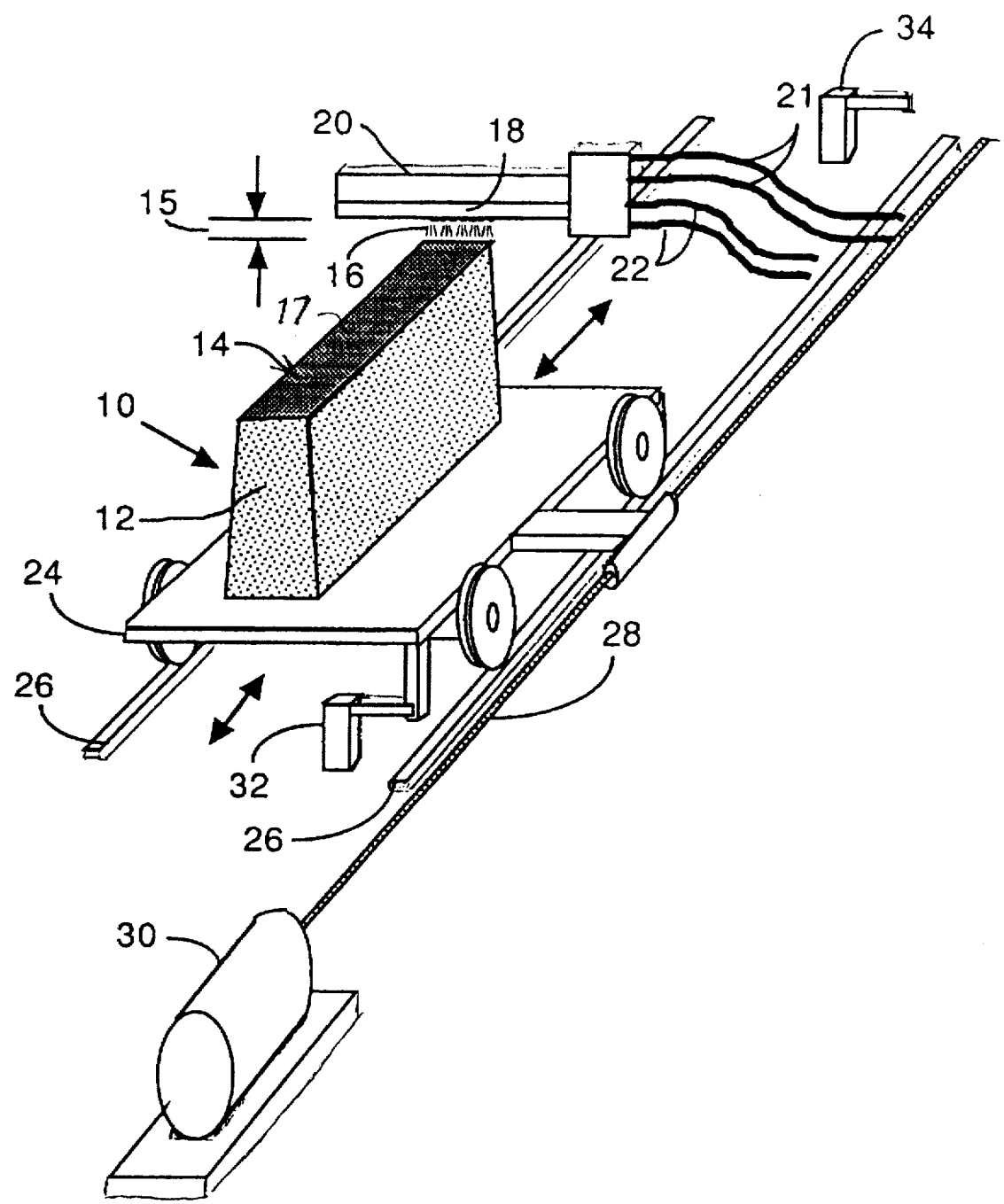
FIG. 1 shows schematically a preferred embodiment of the present invention, illustrating a diagram of the inventive process and apparatus for treating the working surface of refractory bricks before their installation in reactors.

The invention is herein described as applied to refractories utilized in direct reduction reactors for the production of sponge iron (DRI), but it will be understood that it can be adapted to other reactors and furnaces wherein a refractory lining has been installed for carrying out iron ore reduction. With reference to FIG. 1, numeral 10 generally designates a refractory brick to be treated, having non-working surfaces 12 and a working surface 14 (i.e. the surface 14 that is exposed directly to the reactor's interior hot atmosphere). In the illustrated preferred example, the working surface 14 of the brick 10 is coated with a mixture 17 of silica sand and water, preferably in a ratio of 4 parts of sand to 1 part of water by weight; said coating preferably having a thickness from 0.1 to 2 millimeters. Effective binders other than water could be used, but probably not as inexpensively. The sand utilized has preferably a grain size of up to −100 mesh, e.g. having openings of about 0.25 millimeters. The surface is then dried and any excess of sand removed, filling the voids in the brick and presenting a smooth surface. The surface to be treated is passed in front of a high temperature flame 16, having a temperature above 1,700° C., preferably above 2,000° C., produced for example by an oxy-acetylene burner 18 fed with standard piping for fuel and oxidant 22. The burner 18 is protected by a cooling sleeve 20 through which cooling water is passed in order to maintain the burner at allowable metal temperatures. Suitable piping 21 for cool water feeding and hot water removal are connected to said cooling sleeve 20. The burner nozzles are positioned at a close distance 15 (extending from their nozzle openings to the surface to be treated); so that the flame impinges directly on the sand grains and while fusing them the hot gases cause the resulting fused surface to present rounded angles as can be appreciated by reference to FIG. 3 photomicrograph. This distance (for an array of oxy-acetylene torch nozzles) is preferably maintained within 0.5 to 2 millimeters (depending on the flame shape and intensity etc.).

Suitable means are utilized to move the flame in relation to the surface treated, for example a moving platform 24 mounted on wheels which move on tracks 26. Driving means, for example an endless screw 28 rotated by motor 30 moves the platform 24 back and forth by changing its direction of rotation. Micro switches 32 and 34 operated by the platform activate the change in direction of rotation the motor 30. An operator then replaces the already treated brick for an untreated brick at one or both of the ends of track 26. It is to be understood of course that the relative movement between the brick to be treated 10 and the burner 18 can be done by moving the burner instead of the brick, or using other means for causing said movement other than the platform 24. The translational velocity of the surface 14 relative to the flame 16 must be fast enough so that the sand grains coating said surface 16 melt down but not so slow as to permit heat transmission into the body of the brick which would cause the brick to be generally super heated and thereby develop internal stresses and other alterations in the quality characteristics of the brick. This velocity in the illustrated embodiment preferably is in the range from about 1 to about 2 cm/sec.

Figure 2:
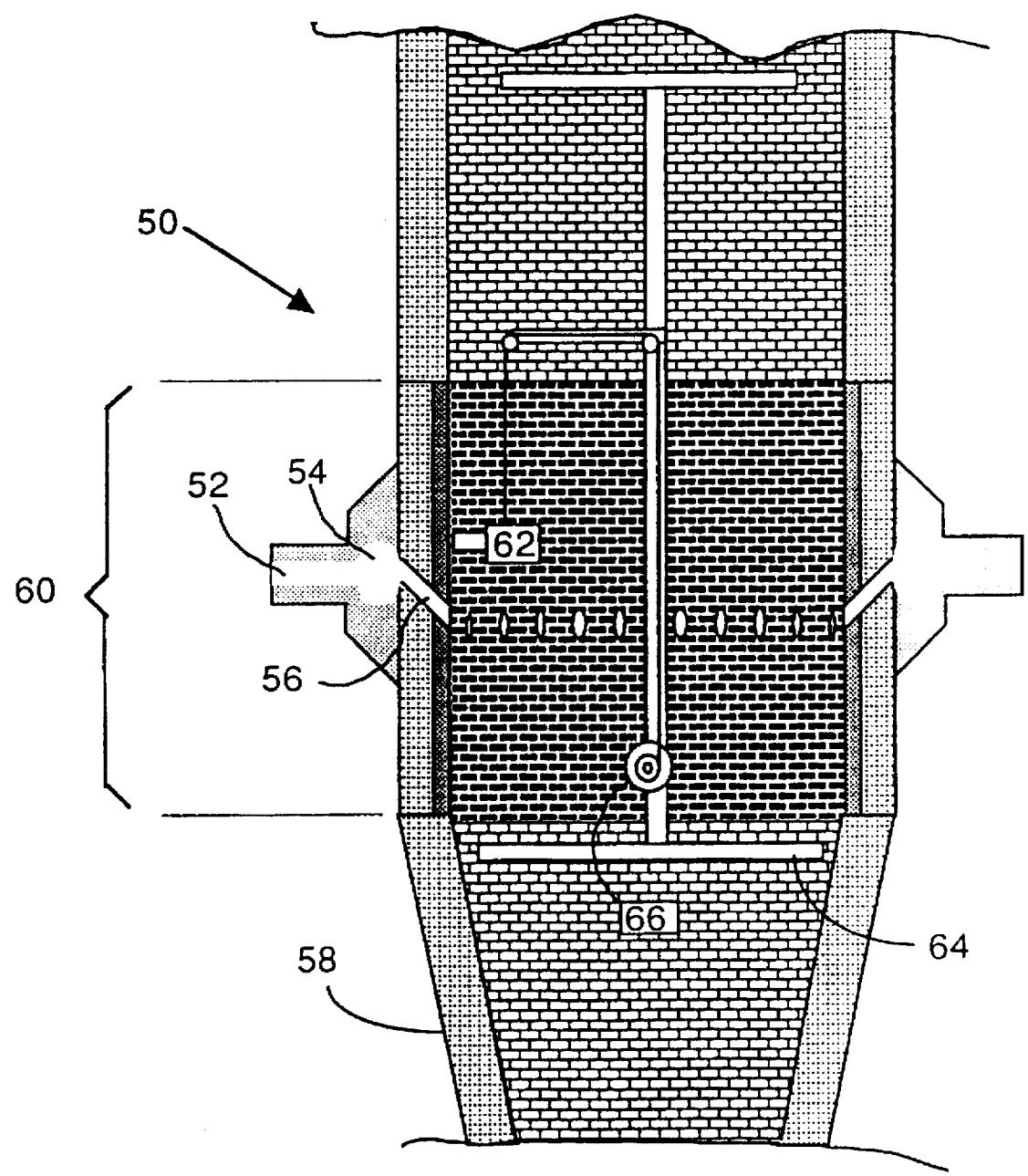
FIG. 2 shows schematically another embodiment of the invention for treating the working surface of refractory bricks after they have been installed in a direct reduction reactor.

Referring now to FIG. 2, showing the treatment of refractory bricks already installed in a reactor, the numeral 50 generally designates a direct reduction reactor of the type where a moving bed of iron ore particles, usually pellets, descend downwardly and are contacted with a reducing gas with a composition comprising principally hydrogen and carbon monoxide, plus carbon dioxide and methane, and minor amounts of other hydrocarbons and nitrogen, at a temperature in the range of about 850° C. to about 1050° C. Such reducing gas is introduced to the reactor 50 at point 52 and is distributed through a plenum chamber 54 around the reactor so that the reducing gas enters from the periphery through nozzles 56 and is removed from the reactor through an outlet not shown located in the upper part of said reactor, in a manner already known in the art (see patents cited above).

At the lower part of reactor 50, there is a conical section 58 which converges to at least one outlet, not shown, through which the already reduced ore or Direct Reduced Iron (DRI) is discharged. In many plants this lower zone 58 is used as a cooling zone for DRI, in order to cool it down to ambient temperature for its handling without reoxidation problems. In order to cool down DRI, normally a cooling gas stream is circulated countercurrently to the DRI. Such cooling gas is introduced at the lower part thereof, and is removed hot at the upper part thereof. Both the reducing gas and the cooling gas are recycled to the reactor. When it is desired to discharge the DRI at high temperature, for example for immediate feed to an electric arc steelmaking furnace or for briquettes manufacturing, the cooling gas is not circulated through the lower zone 58 and is discharged hot.

The hottest zone of the reactor 50 is that zone proximal to the entrance of the hot reducing gas, which is designated by numeral 60 and comprises about 2 meters above and below the level of the hot reducing gas nozzles 56. The refractory surface of this zone 60 is treated according to the invention in order to decrease the adhesion of iron ore particles to the refractory bricks. An oxy-acetylene flame having a temperature above 1.700° C., preferably above 2,000° C. is produced in a burner 62 in known manner and is applied to the surface of the refractory bricks which will face the iron ore particles to be reduced. The connections of oxygen, acetylene, cooling water are not shown for simplicity of the schematic diagram. A scaffold 64 or a similar support is positioned inside the reactor in order to move the burner 62 relative to the reactor walls by means, for example, of a suspension system 66 (shown as a winch with a swing arm suspending burner 62 by a cable) which can be controlled by an operator so as to fuse the sand grains applied with water to the internal surface of the zone 60. Treatment of installed bricks is made in the same way as the treatment of individual bricks as illustrated in FIG. 1, namely: a mixture of silica sand and water is applied to the surface to be treated, said surface is then dried and the excess of sand removed and the high temperature flame is applied to said surface. Surprisingly, the method is effective even on such vertical surfaces.

Figure 3:
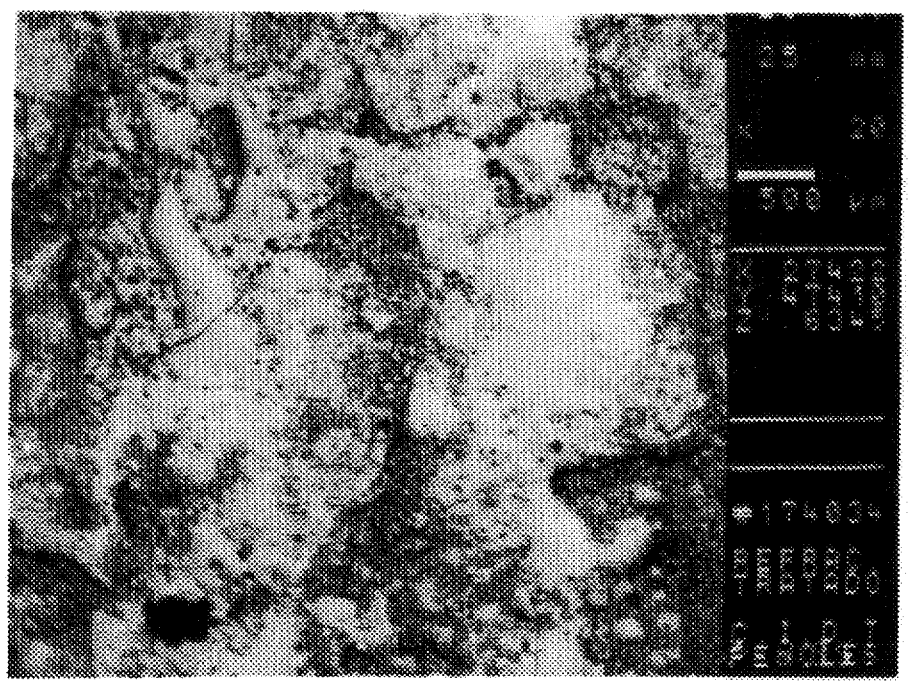
FIG. 3 shows an enlarged photomicrograph of the brick surface after treatment according to the invention.
Figure 4:
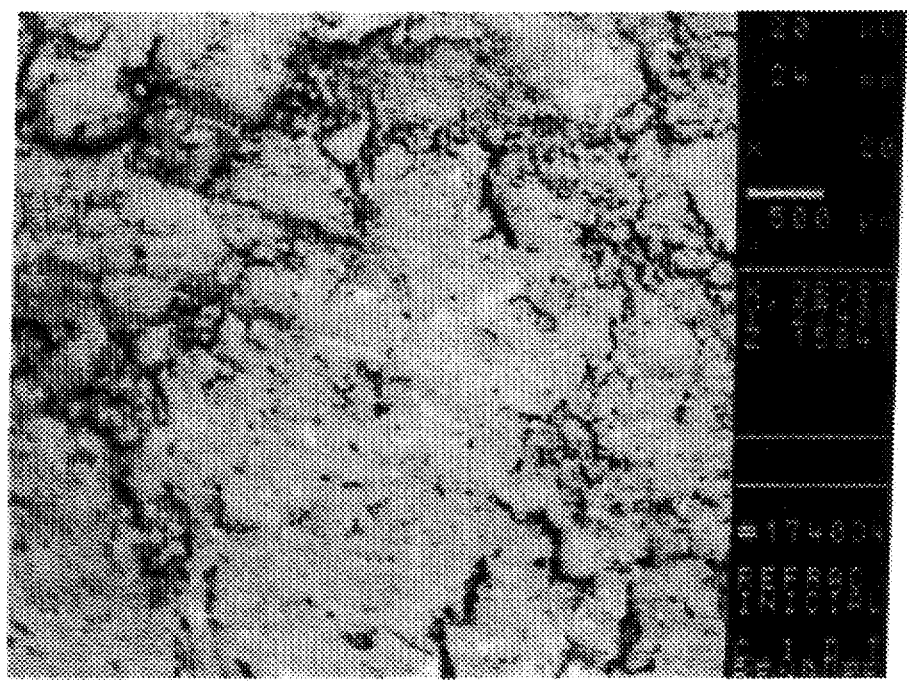
FIG. 4 shows an enlarged photomicrograph of the brick surface before treatment according to the invention.

FIG. 4 is a photomicrograph of the surface of a refractory brick before being treated according to the invention. FIG. 3 is a photomicrograph of the same surface after treatment. FIG. 3 shows that certain areas have been fused and that the cracks and irregularities of the surface of the untreated brick have been greatly improved by filling, fusing, and smoothing. It will be clear that the treatment by direct heating of the silica coating to temperatures above the melting temperature of the silica sand will cause this sand to fuse and provide a smoother surface such that the iron ore particles will find less voids and peaks and in general less places suitable to physically sustain the build up of "slabs" and agglomerates on the surface of the bricks.

From the foregoing description it should be apparent that the present invention provides a process capable of achieving the several objects of the invention set forth above.

It is of course to be understood that the foregoing description is intended to be illustrative only and that numerous changes can be made in the structure of the system described and its operating conditions without departing from the spirit of the invention as defined in the appended claims. The invention can be applicable to any refractory lining of a vessel wherein iron ore particles are reduced and can adhere to the reactor internal refractory lining.

What is claimed is:

1. A method of treating the rough working surface of a solid ceramic refractory material used in lining a vessel for thermally treating iron-bearing particles below their melting temperature, where at least part of the refractory material is in the form of a brick for use in a vessel functioning as a direct reduction reactor for treating iron ore particles with reducing gas at temperatures from about 750° C. to about 1050° C. to produce sponge iron particles, comprising:

applying to said working surface a coating of ceramic particles having a using temperature above the melting temperature of the iron-bearing articles and subjecting the coated surface of said refractory materials to a temperature for a time short enough to avoid generalized heating of said refractory material yet long enough to fuse said ceramic particles onto said working surface to form a glaze thereon that smooths and at least partially fills voids and cracks in said surface and is effective to reduce the tendency of material from a burden of hot iron-bearing particles passing across the resulting surface build up on said surface said ceramic particles being chosen from the group consisting of silica, of ground firebrick, and of other refractory material having refractory properties equivalent to silica or firebrick, at least 20% of which firebrick or refractory particles are silica and two-thirds of which are alumina combined with silica.

2. A method according to claim 1, wherein said particles has a size which passes 100 mesh.

3. A method according to claim 2, wherein said fused coating of particles results in a glaze with a thickness of about 0.2 to 1 millimeter.

4. A method according to claim 1, wherein said fusing is by means of a high temperature flame generated by burning an oxy-acetylene mixture.

5. A method according to claim 4, wherein said flame is applied to said surface to be treated within a distance in the range of 0.5 millimeters to 2 centimeters.

6. A method according to claim 5, wherein said flame is moved in relation to said surface to be treated at a velocity in the range of 0.2 to 5 cm/sec.

7. A method according to claim 4, wherein the ceramic particles are applied to said working surface mixed with a binding agent adequate to hold such particles in place when initiating fusion without adversely causing increased porosity in or contamination of the resulting fused surface.

8. A method according to claim 7, wherein said binding agent is water, drying said silica prior to fusing.

9. A method according to claim 4, wherein the fine particles are silica and are brushed dry onto said working surface positioned substantially vertically.

10. A method according to claim 1, wherein said fusion temperature is in excess of 1200° C.

11. A method according to claim 1, wherein said fusion temperature is in excess of 1700° C.

12. A method according to claim 1, wherein said resulting glaze is effective to reduce the buildup thereon over a unit time by a factor of at least 10 of materials from the hot iron ore and/or sponge iron heated to near incipient stickiness by being subjected to reducing gas at temperatures in the range of about 900° C. to about 1050° C.

13. An iron ore direct reduction reactor for producing sponge iron with hot reducing gas, comprising:

an internal refractory lining defining at least a reduction zone which zone includes a portion exposed to high reducing gas temperatures, said lining having some of its internal working surface glazed which includes at least said high temperature portion and further having other internal working surface unglazed, said glazed surface being formed of a ceramic coating which smooths and at least partially fills voids and cracks in said surface and is effective to reduce the tendency of material from a burden of hot iron-bearing particles heated to incipient stickiness at reducing temperatures to build up on said surface when rubbed thereacross.

14. A reactor, according to claim 13, comprising said glaze having been formed thereon from silica.

15. Method of treating the rough working surface of refractory material, including refractory brick, used in lining a direct reduction reactor for producing sponge iron particles at temperatures on the order of 900° C. to 1050° C., comprising:

applying to said working surface a thin layer of fine ceramic particles passing a −100 mesh, and fusing said ceramic particles onto said surface to form a glaze thereon sufficient to at least partially fill voids in said surface and reduce the tendency of composition from the sponge iron particles passing across the resulting surface to build up on said surface, said ceramic particles (1) being chosen from the group consisting of silica, of ground firebrick, and (equivalent) of other refractory material having refractory properties equivalent to silica or firebrick, at least 20% of which firebrick or refractory particles are silica and two-thirds of which are alumina combined with silica, (2) fusing said particles onto the working surface by limited localized surface heating to form as a glaze a ceramic coating of about 0.2 mm. to 1 mm. thick, (3) having a fusion temperature in excess of 1200° C., and (4) forming said glaze on said working surface effectively reduce the buildup of DRI materials thereon over a unit time by a factor of at least 10.

16. Method for the direct reduction of iron ore to produce sponge iron, comprising reducing a moving bed of iron ore particles in a reactor lined with refractory material by a countercurrent flow of reducing gas composed principally of hot hydrogen and carbon monoxide at temperatures of from 750° C. to 1050° C. introduced into, through, and out of, a reducing zone within said reactor, the improvement of using a ceramic coating on only part of the inner working surface of the refractory material which part includes at least the hottest part of the reducing zone in the vicinity of the introduction of the hot reducing gas into the reducing zone, said coating being in the form of a glaze thereon that smooths and at least partially fills voids and cracks in said surface and is effective to reduce the tendency of material from the moving bed of hot incipiently sticky iron-ore particles rubbing across the refractory surface to build up on said surface.

17. A method according to claim 16, wherein said ceramic coating is used only in the vicinity of said hottest part of said reducing zone.

18. A reactor according to claim 13, wherein said coating forms a glaze with a thickness of about 0.2 to 1 millimeter.

19. A reactor according to claim 13, wherein said glaze is effective to reduce the buildup thereon over a unit time by a factor of at least 10 of material from any hot iron ore or sponge iron rubbing thereover after being heated to near incipient stickiness and subjected to reducing gas at temperatures in the range of 900° C. to 1050° C.

20. A reactor according to claim 19 wherein said ceramic particles are silica.

21. A reactor according to claim 18, wherein the glaze coating is formed thereon by localized fusing of a thin layer of fine ceramic particles having a fusion temperature in excess of 1200° C.

22. A reactor according to claim 21, wherein said glaze is effective to reduce the buildup thereon over a unit time by a factor of at least 10 of material from any hot iron ore or sponge iron rubbed thereover after being heated to near incipient stickiness and subjected to reducing gas at temperatures in the range of 900° C. to 1050° C.

* * * * *